United States Patent
Oakes

(10) Patent No.: US 6,651,638 B1
(45) Date of Patent: Nov. 25, 2003

(54) SYSTEM AND METHOD FOR DERATING AN ENGINE TO ENCOURAGE SERVICING OF A VEHICLE

(75) Inventor: Jeffrey L. Oakes, Columbus, IN (US)

(73) Assignee: Cummins Engine Company, Inc., Columbus, IN (US)

( * ) Notice: Subject to any disclaimer, the term of this patent is extended or adjusted under 35 U.S.C. 154(b) by 0 days.

(21) Appl. No.: 10/185,517

(22) Filed: Jun. 28, 2002

(51) Int. Cl.[7] ............... F02D 41/22; F01N 3/021
(52) U.S. Cl. ............... 123/676; 60/277; 60/311
(58) Field of Search ............... 123/396, 676; 60/277, 311, 285

(56) References Cited

U.S. PATENT DOCUMENTS

| | | | |
|---|---|---|---|
| 4,319,896 A | * | 3/1982 | Sweeney ............... 60/311 |
| 4,538,411 A | | 9/1985 | Wade et al. |
| 4,604,868 A | | 8/1986 | Nomoto et al. |
| 4,934,142 A | | 6/1990 | Hayashi et al. |
| 4,986,069 A | | 1/1991 | Barris et al. |
| 5,060,474 A | * | 10/1991 | Aramaki ............... 60/277 |
| 5,067,320 A | | 11/1991 | Kanesaki |
| 5,211,009 A | | 5/1993 | Houben et al. |
| 5,319,930 A | | 6/1994 | Shinzawa et al. |
| 5,331,808 A | * | 7/1994 | Koike ............... 60/277 |
| 5,373,733 A | | 12/1994 | Fuchs et al. |
| 5,511,413 A | | 4/1996 | Pfister et al. |
| 5,519,992 A | * | 5/1996 | Hosoya et al. ............... 60/277 |
| 5,524,433 A | * | 6/1996 | Adamczyk et al. ............... 60/277 |
| 5,544,482 A | * | 8/1996 | Matsumoto et al. ............... 60/311 |
| 5,595,580 A | | 1/1997 | Kawamura |
| 6,010,547 A | | 1/2000 | Jeong et al. |
| 6,245,306 B1 | | 6/2001 | Miyazaki et al. |
| 6,397,587 B1 | * | 6/2002 | van Nieuwstadt et al. .... 60/277 |
| 6,467,472 B1 | * | 10/2002 | Strauss ............... 123/676 |

* cited by examiner

Primary Examiner—Erick Solis

(57) ABSTRACT

In one embodiment of the present invention, a system is disclosed for monitoring the backpressure produced by a particulate filter of an internal combustion engine. When the backpressure of the engine exceeds a predetermined threshold, indicating that the particulate filter should be serviced soon, an input to the electronic control module (ECM) indicating the intake manifold boost pressure is shunted to ground, thereby giving the ECM a false indication that no boost is being applied to the intake manifold. This will cause the ECM, according to its normal engine management software, to derate the engine performance to a "no air torque setting", thereby limiting the amount of torque that the vehicle operator can extract from the engine. This decreased performance of the engine provides a very high incentive to the vehicle operator to bring the vehicle in for servicing, at which point the particulate filter can be serviced. Upon servicing of the particulate filter, the backpressure threshold condition is no longer met, the input line to the ECM from the boost pressure sensor is no longer shunted to ground, and engine operation is returned to normal. Other embodiments of the present invention contemplate the use of engine performance derating in order to provide the vehicle operator with an incentive to have any sensed engine or vehicle condition serviced.

27 Claims, 3 Drawing Sheets

SYSTEM AND METHOD FOR DERATING AN ENGINE TO ENCOURAGE SERVICING OF A VEHICLE

TECHNICAL FIELD OF THE INVENTION

The present invention generally relates to internal combustion engines and, more particularly, to a system and method for derating an engine to encourage servicing of a vehicle.

BACKGROUND OF THE INVENTION

It is well established that vehicles having internal combustion engines require both periodic routine maintenance and non-routine maintenance, particularly with respect to the internal combustion engine. Many elements of an internal combustion engine are designed to receive preventative maintenance at preestablished times or to require servicing as the performance of various components is compromised through use. For example, and not by way of limitation, many vehicles include internal combustion engines which have a particulate filter disposed in-line with the exhaust system. One such prior art internal combustion engine is illustrated schematically in FIG. 1.

As is known in the art, an internal combustion engine 10 includes an intake manifold 12 for the induction of air to be mixed with the fuel supply (not shown). The engine 10 also includes an exhaust manifold 14 for carrying away exhaust gases produced by the combustion process. Some engines, such as the one illustrated in FIG. 1, include a turbocharger 16, which utilizes a finned wheel 18 driven by exhaust gases to rotate a coupled compressor wheel 20 that is operative to compress fresh intake air at the inlet 22 in order to provide a denser air supply to the intake manifold 12. The incorporation of a turbocharger 16 is not necessary for practice of the present invention.

The engine 10 may have a particulate filter 24 positioned in-line with the exhaust system, particularly if the engine 10 is a diesel engine. The function of the particulate filter is to trap the majority of solid particulate matter produced by the combustion process within the engine 10 before the exhaust gases reach other sensitive exhaust aftertreatment components (such as a catalytic converter) downstream 26 from the particulate filter 24 or before the exhaust gases are simply exhausted to the environment.

It is well known in the art that a particulate filter 24 will eventually become partially clogged by the particulate matter that it is extracting from the exhaust gas. Such partial clogging creates a restriction to the flow of exhaust gases through the particulate filter 24, thereby increasing the pressure of the exhaust gases upstream from the particulate filter 24. This increase in exhaust gas pressure is known as backpressure. Increases in backpressure actually produce work in opposition to the productive work being performed by the engine 10, thereby lowering its performance. Because of this, it is desirable to clean or replace the particulate filter 24 after it has achieved some level of particulate blockage. In the prior art system shown in FIG. 1, the backpressure is measured by a pressure sensor 28 and the signal is applied as an input to an electronic control module (ECM) 30, which functions as a control system managing performance of the engine 10. The software within ECM 30 is designed to evaluate the backpressure sensed by pressure sensor 28 in comparison to two thresholds. When the backpressure exceeds a first threshold, the ECM 30 activates a first output in order to illuminate a yellow warning light 32 that is visible to the driver. When the backpressure sensed by sensor 28 exceeds a second, higher level, ECM 30 activates a second output in order to illuminate a red warning light 34, also visible to the driver. It will be understood that sensor 28 can be a transducer or simply a threshold switch.

Ideally, upon observation of the yellow warning light 32, the driver of the vehicle will arrange for service of the particulate filter 24 at the next available opportunity. Certainly by the time the red warning light 34 is illuminated, service of the particulate filter 24 should be a high priority for the driver of the vehicle. Unfortunately, many engines 10, particularly heavy duty diesel engines, are installed in vehicles which are being driven by persons other than those who own the vehicles. Such persons often do not have maintenance of the vehicle as their highest priority, particularly when the operator of the vehicle receives compensation in proportion to the amount of time that the vehicle is being operated.

The above-illustrated problem in inducing a vehicle operator to perform service of the particulate filter 24 is merely illustrative of a more widespread problem in encouraging vehicle operators to perform any necessary service that is not severely impacting the operability of the vehicle. In many cases, delaying such service can cause further damage to the vehicle, greatly increasing the cost of service. There is therefore a need in the prior art for a system which will provide an increased incentive to the operator of the vehicle to perform necessary service to the vehicle. The present invention is directed toward meeting this need.

SUMMARY OF THE INVENTION

In one embodiment of the present invention, a system is disclosed for monitoring the backpressure produced by a particulate filter of an internal combustion engine. When the backpressure of the engine exceeds a predetermined threshold, indicating that the particulate filter should be serviced soon, an input to the electronic control module (ECM) indicating the intake manifold boost pressure is shunted to ground, thereby giving the ECM a false indication that no boost is being applied to the intake manifold. This will cause the ECM, according to its normal engine management software, to derate the engine performance to a "no air torque setting", thereby limiting the amount of torque that the vehicle operator can extract from the engine. This decreased performance of the engine provides a very high incentive to the vehicle operator to bring the vehicle in for servicing, at which point the particulate filter can be serviced. Upon servicing of the particulate filter, the backpressure threshold condition is no longer met, the input line to the ECM from the boost pressure sensor is no longer shunted to ground, and engine operation is returned to normal. Other embodiments of the present invention contemplate the use of engine performance derating in order to provide the vehicle operator with an incentive to have any sensed engine or vehicle condition serviced.

In one form of the present invention, a method for derating an engine to encourage servicing of a particulate filter in an exhaust system of the engine is disclosed, comprising the steps of a) sensing an exhaust backpressure upstream of the particulate filter; b) comparing the backpressure to a first threshold value; c) illuminating a first warning light visible to an operator of the engine if the backpressure exceeds the first threshold value; d) comparing the backpressure to a second threshold value; e) illuminating a second warning light visible to the operator if the backpressure exceeds the second threshold value; f) comparing the backpressure to a third threshold value; and g) derating a performance characteristic of the engine if the backpressure exceeds the third threshold value.

In another form of the embodiment, a method for derating an engine to encourage servicing of a particulate filter in an exhaust system of the engine is disclosed, comprising the steps of a) sensing an exhaust backpressure upstream of the particulate filter; b) comparing the backpressure to a threshold value; and c) derating a performance characteristic of the engine if the backpressure exceeds the threshold value.

In yet another form of the embodiment, a method for derating an engine to encourage servicing of a vehicle into which the engine is installed is disclosed, comprising the steps of a) sensing a condition of the vehicle; b) comparing the condition to a threshold value, wherein servicing of the vehicle is warranted if the condition exceeds the threshold value; and c) derating a performance characteristic of the engine if the condition exceeds the threshold value.

In another form of the embodiment, a system for derating an engine to encourage servicing of a particulate filing in an exhaust system of the engine is disclosed, comprising a sensor operable to sense an exhaust backpressure upstream of the particulate filter, the sensor having a sensor output; and an electronic control module having a first electronic control module input coupled to the sensor output and having an electronic control module output coupled to the engine; wherein the electronic control module is operative to change a state of the electronic control module output if the sensor output exceeds a predetermined level; and wherein changing the state of the electronic control module output is operative to derate a performance characteristic of the engine.

DETAILED DESCRIPTION OF THE PREFERRED EMBODIMENTS

Figure 1:
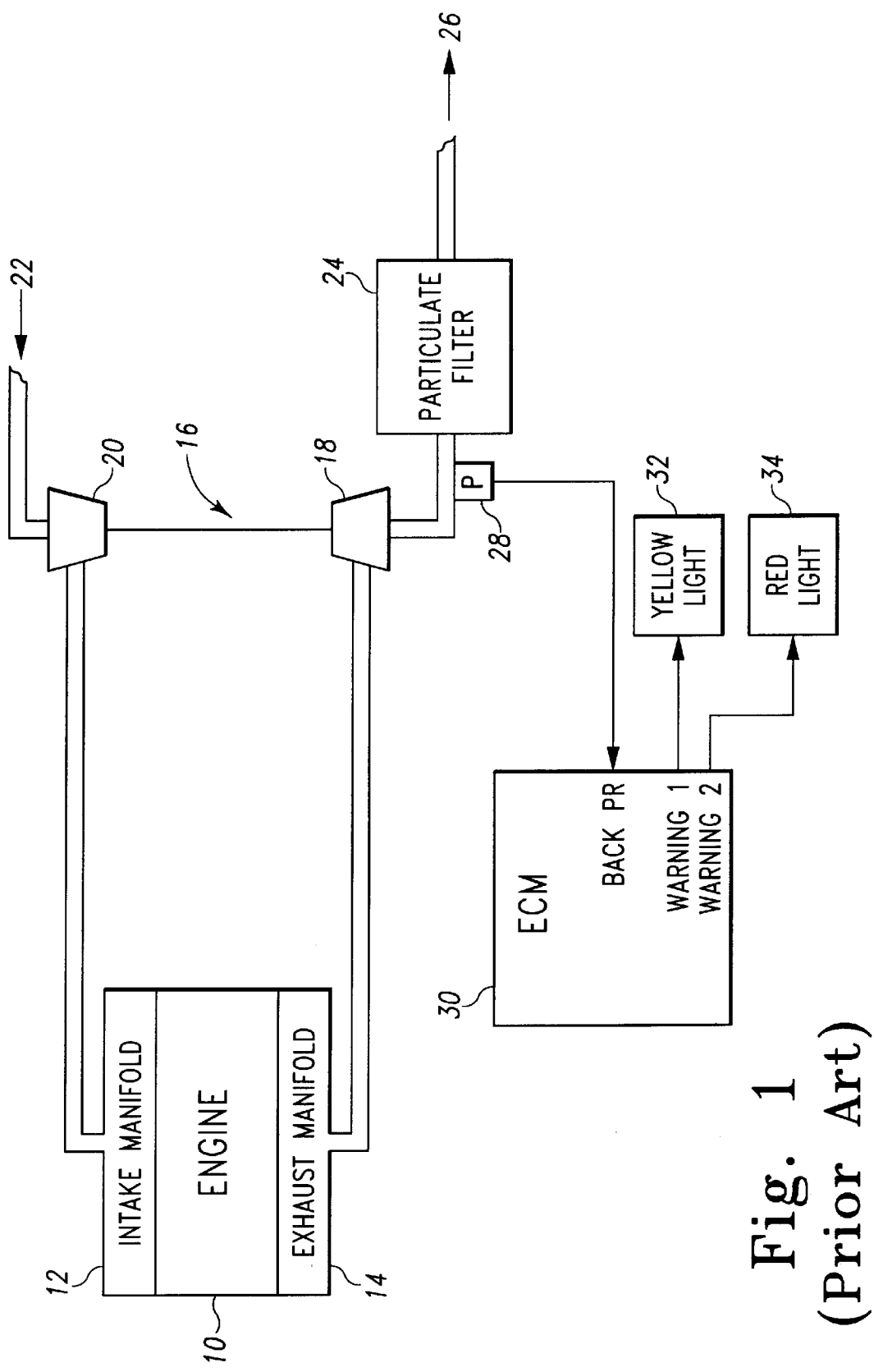
FIG. 1 is a schematic block diagram of a prior art engine and engine control system.

For the purposes of promoting an understanding of the principles of the invention, reference will now be made to the embodiment illustrated in the drawings and specific language will be used to describe the same. It will nevertheless be understood that no limitation of the scope of the invention is thereby intended, and alterations and modifications in the illustrated device, and further applications of the principles of the invention as illustrated therein are herein contemplated as would normally occur to one skilled in the art to which the invention relates.

For sake of clarity of description, the detailed description presented hereinbelow describes an electronic control module (ECM) 30 that provides all of the control functions required in the preferred embodiment, including accepting inputs of backpressure and boost pressure, determining if derating of engine performance is warranted, calculating fueling levels for the engine, creating outputs to activate a torque limiting device, lights, etc. However, in a particularly preferred embodiment, a separate emissions monitor (EM) is provided to accept the backpressure input, determine if derating of engine performance is warranted, and to create outputs to activate the torque limiting device and lights, while the remaining functions are performed by the ECM. The two configurations are equivalent, but the description of the system utilizing only a single ECM is more straightforward and has thus been presented below.

Figure 2:
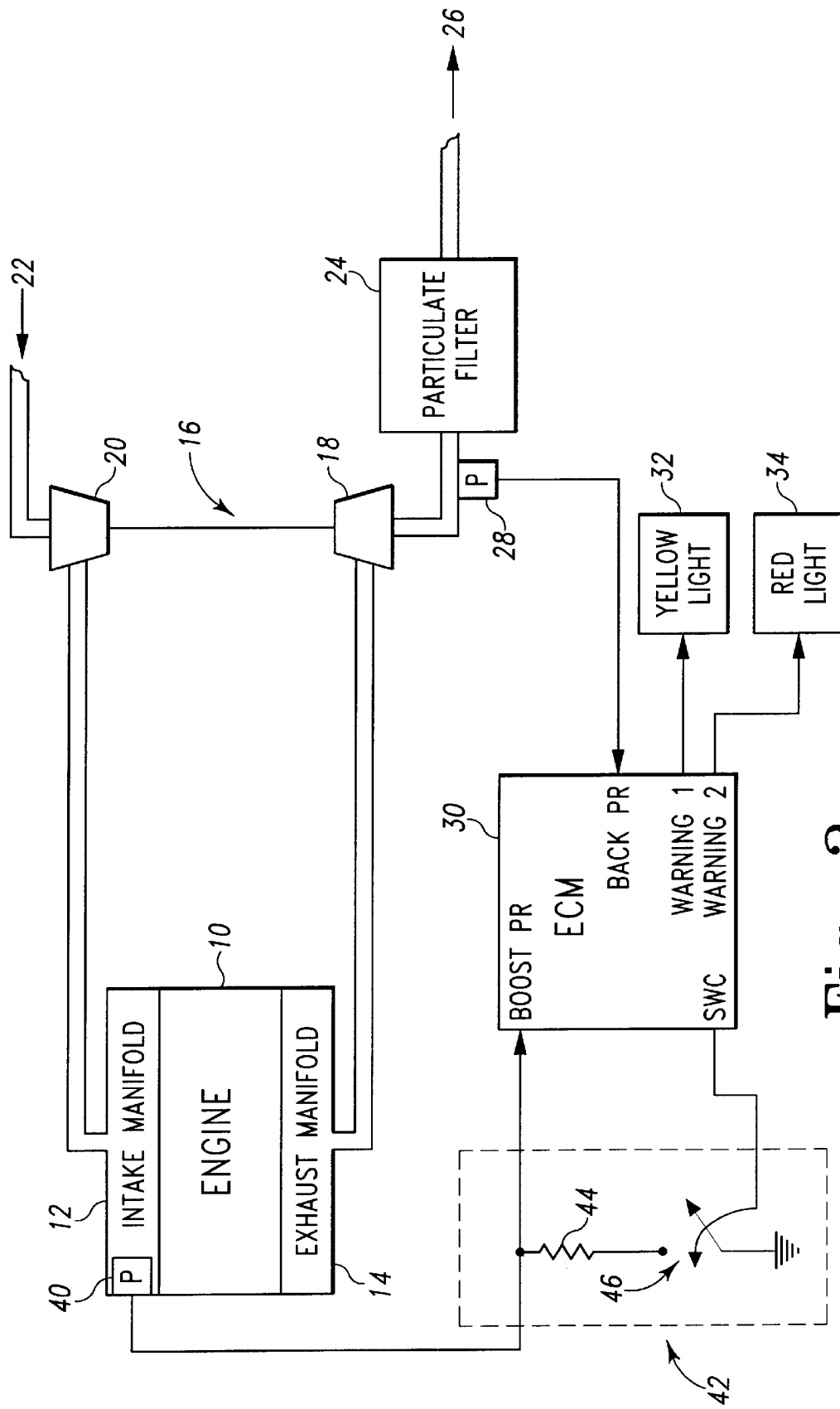
FIG. 2 is a schematic block diagram of an engine and engine control system of the preferred embodiment of the present invention.

Referring now to FIG. 2, there is illustrated a schematic block diagram of an engine and engine management system according to the preferred embodiment of the present invention. Individual components in FIG. 2 that are equivalent to components in the prior art system of FIG. 1 are designated using like reference numbers. In the system of FIG. 2, like the system of FIG. 1, backpressure upstream of the particulate filter 24 is sensed with a pressure sensor 28 and provided to the ECM 30. Also, like the prior art system, this pressure is compared to predetermined threshold levels and a yellow warning light 32 and/or red warning light 34 may be displayed to the vehicle operator when the measured backpressure exceeds predetermined thresholds; however, the use of the warning lights 32, 34 are optional in the preferred embodiment of the present invention.

One input to the ECM 30 that is common in turbocharged engines is a boost pressure, in which the pressure in the intake manifold is measured by a pressure transducer 40 and supplied to the ECM 30. Boost pressure is one of the variables typically used by the fueling software contained within ECM 30 in order to determine the amount of fuel to be delivered to the engine. The present invention provides an incentive to the driver to service the vehicle when the ECM determines that this is desirable by inserting a torque limiting device 42 between the pressure transducer 40 and the ECM 30. In a preferred embodiment, the torque limiting device 42 comprises a resistor 44 and a switch 46 in series relationship, shunting the boost pressure signal from the pressure transducer 40 to ground when the switch 46 is closed. The switch 46 is operable by means of an output from the ECM 30. When the switch 46 is closed, the boost pressure signal from the pressure transducer 40 is shunted through the resistance 44 to ground, thereby providing a lower than actual input signal (representing the boost pressure) to the ECM 30.

Figure 3:
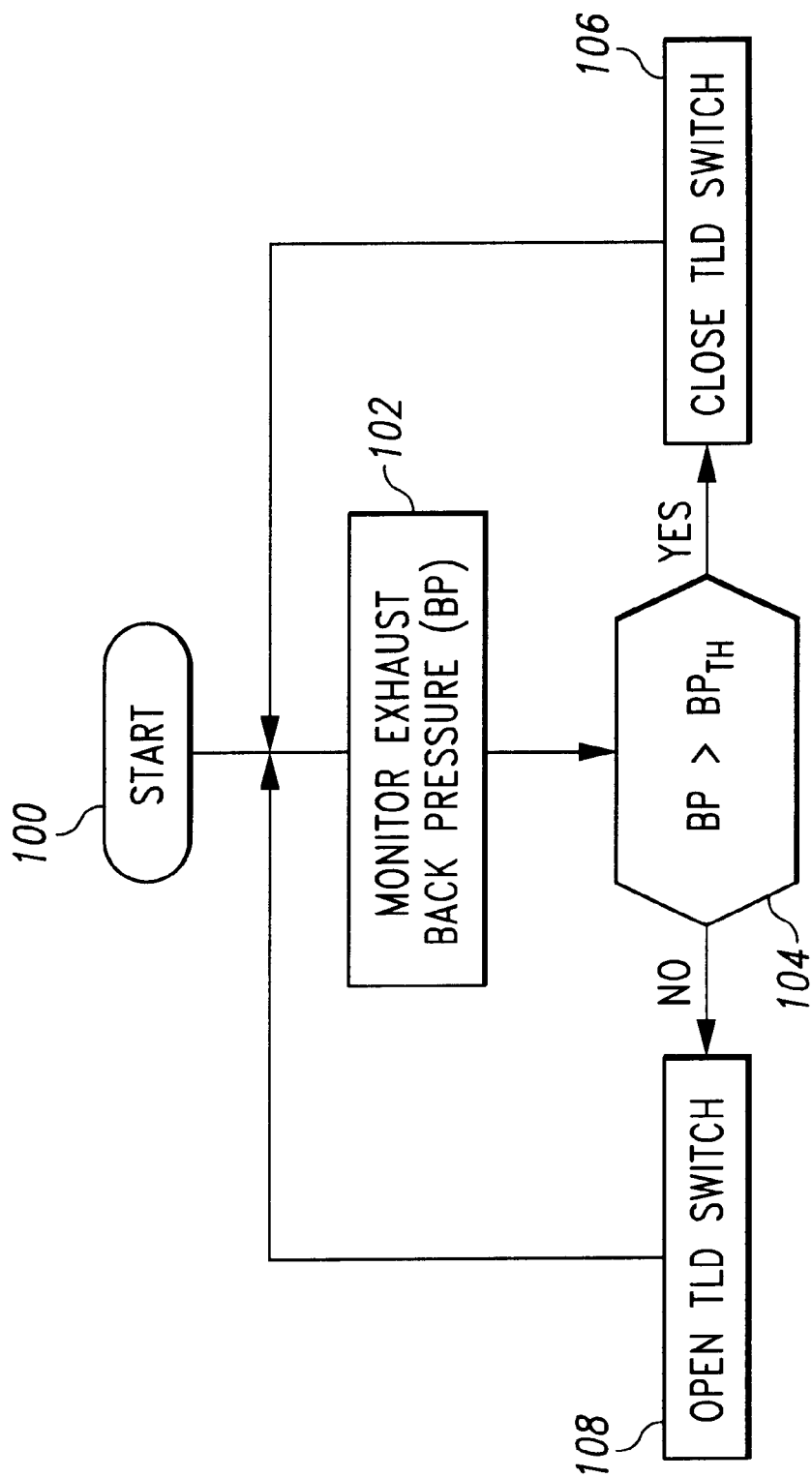
FIG. 3 is a schematic process flow diagram of a preferred embodiment method of the present invention.

Use of the torque limiting device 42 is illustrated in the schematic process flow diagram of FIG. 3. The process starts at step 100 and continues to step 102 where the exhaust backpressure reading from the pressure sensor 28 is input to the ECM 30. At step 104, the ECM 30 compares this measured backpressure signal (BP) to a predetermined backpressure threshold level ($BP_{TH}$). If step 104 determines that the measured backpressure BP is greater than the backpressure threshold $BP_{TH}$, then the ECM 30 activates the appropriate output signal to close switch 46, thereby shunting the boost pressure signal from pressure transducer 40 to ground through the resistor 44. This occurs at step 106. When the switch 46 is closed, the boost pressure sensor 40 signal is held by the resistor 44 to an in-range low condition, which the ECM 30 interprets as zero boost pressure with no active boost pressure sensor faults. If engine torque is requested by the vehicle operator under such conditions, fueling software resident within the ECM 30 automatically derates the engine to a so-called "no-air torque" setting (because the fueling software believes that there is currently no boost pressure). As is known in the art, derating the engine in this manner results in less fuel being provided to the engine 10 and the operator of the vehicle will experience sluggish performance from the engine 10 in response to his request for more torque. If the yellow warning light 32 and red warning light 34 are provided to the driver and have been ignored, the derating of engine performance provided by the torque limiting device 42 will provide increased incentive to the operator to have the vehicle serviced. The same incentive will be provided to the operator if the yellow warning light 32 and red warning light 34 are not provided, however the driver will not be given prior warning before decreased engine performance requires service.

After the torque limiting device 42 is activated at step 106, the process returns to step 102 for continued monitoring of the engine backpressure. After servicing of the particulate filter 24, step 104 will determine that the measured backpressure BP is below the predetermined backpressure threshold $BP^{TH}$ and the process will move to step 108, at which point the ECM 30 will open the switch 46, thereby returning the sensed boost pressure input to the ECM 30 to normal. With a normal input being received from the boost pressure sensor 40, engine operation will return to normal. The process will then continue to step 102 for further backpressure monitoring. In a particularly preferred embodiment, the torque limiting device is latched once activated and can only be reset by service personnel.

As described hereinabove, the predefined backpressure threshold $BP_{TH}$ will typically be set above the pressure value that triggers activation of one or more warning lamps 32, 34. Thus, one or more warning lamps 32, 34 will be activated prior to activating the torque limiting device 42. The system and method of the present invention therefore provides an additional incentive (in the form of a performance disincentive) to encourage the vehicle operator to have the required particulate filter service/cleaning performed.

It will be appreciated by those having ordinary skill in the art that, while the preferred embodiment of the present invention has been described in relation to sensing backpressure caused by a particulate filter and shunting the boost pressure signal to ground once the signal exceeds the predetermined threshold, the concepts of the present invention can be applied to provide an incentive to a vehicle operator to perform any necessary service. Therefore, in its broadest form, the present invention provides for the sensing of a condition of a vehicle for which the operator of the vehicle should have service performed. In order to provide an incentive to the operator to perform this service, the performance of the engine can be derated in some manner such that lower than normal performance will be available from the vehicle engine until the required service has been performed. Such engine performance derating can be provided in a multitude of ways, including derating of the fueling command, limiting the engine speed, limiting gear transitions in an automatic transition, etc.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A method for derating an engine to encourage servicing of a particulate filter in an exhaust system of the engine, comprising the steps of:
   a) sensing an exhaust backpressure upstream of the particulate filter;
   b) comparing the backpressure to a first threshold value;
   c) illuminating a first warning light visible to an operator of the engine if the backpressure exceeds the first threshold value;
   d) comparing the backpressure to a second threshold value; and
   e) illuminating a second warning light visible to the operator and derating a performance characteristic of the engine if the backpressure exceeds the second threshold value.

2. The method of claim 1, wherein the engine comprises a diesel engine.

3. The method of claim 1, wherein the engine is turbocharged.

4. The method of claim 1, wherein the second threshold value is greater than the first threshold value.

5. The method of claim 1, wherein step (e) further comprises derating a fueling of the engine if the backpressure exceeds the second threshold value.

6. The method of claim 1, wherein step (e) further comprises shunting an input to an electronic control module to ground through a resistor if the backpressure exceeds the second threshold value.

7. The method of claim 6, wherein the input comprises a boost sensor input.

8. A method for derating an engine to encourage servicing of a particulate filter in an exhaust system of the engine, comprising the steps of:
   a) sensing an exhaust backpressure upstream of the particulate filter;
   b) comparing the backpressure to a threshold value; and
   c) derating a performance characteristic of the engine if the backpressure exceeds the threshold value.

9. The method of claim 8, wherein the engine comprises a diesel engine.

10. The method of claim 8, wherein the engine is turbocharged.

11. The method of claim 8, wherein step (c) further comprises derating a fueling of the engine if the backpressure exceeds the threshold value.

12. The method of claim 8, wherein step (c) further comprises shunting an input to an electronic control module to ground through a resistor if the backpressure exceeds the threshold value.

13. The method of claim 12, wherein the input comprises a boost sensor input.

14. A method for derating an engine to encourage servicing of an exhaust system of the engine, comprising the steps of:
   a) sensing a condition of the exhaust system;
   b) comparing the condition to a threshold value, wherein servicing of the exhaust system is warranted if the condition exceeds the threshold value; and
   c) derating a performance characteristic of the engine if the condition exceeds the threshold value.

15. The method of claim 14, wherein the engine comprises a diesel engine.

16. The method of claim 14, wherein the engine is turbocharged.

17. The method of claim 14, wherein the condition comprises a backpressure upstream from a particulate filter in an exhaust system of the engine.

18. The method of claim 14, wherein step (c) further comprises derating a fueling of the engine if the condition exceeds the threshold value.

19. The method of claim 14, wherein step (c) further comprises shunting an input to an electronic control module to ground through a resistor if the condition exceeds the threshold value.

20. The method of claim 19, wherein the input comprises a boost sensor input.

21. A system for derating an engine to encourage servicing of a particulate filter in an exhaust system of the engine, comprising:

a sensor operable to sense an exhaust backpressure upstream of the particulate filter, the sensor having a sensor output; and an electronic control module having a first electronic control module input coupled to the sensor output and having an electronic control module output coupled to the engine;

wherein the electronic control module is operative to change a state of the electronic control module output if the sensor output exceeds a predetermined level; and wherein changing the state of the electronic control module output is operative to derate a performance characteristic of the engine.

22. The system of claim 21, wherein the engine comprises a diesel engine.

23. The method of claim 21, wherein the engine is turbocharged.

24. The system of claim 21, wherein changing the state of the electronic control module output is operative to derate a fueling of the engine.

25. The system of claim 21, further comprising:

a torque limiting device coupled to the electronic control module output.

26. The system of claim 25, wherein the torque limiting device further comprises:

a resistor having a resistor input coupled to a second electronic control module input and also having a resistor output; and a switch having a first switch terminal coupled to the resistor output, a second switch terminal coupled to ground, and a switch control terminal coupled to the electronic control module output;

wherein changing the state of the electronic control module output is operable to change a state of the switch.

27. The system of claim 26, wherein the second electronic control module input comprises a boost sensor input.

* * * * *